United States Patent [19]

Bergner

[11] Patent Number: 4,929,134
[45] Date of Patent: May 29, 1990

[54] EXPANSION DOWEL ASSEMBLY

[75] Inventor: Arndt Bergner, Munich, Fed. Rep. of Germany

[73] Assignee: Hilti Aktiengesellschaft, Fürstentum, Liechtenstein

[21] Appl. No.: 247,956

[22] Filed: Sep. 22, 1988

[30] Foreign Application Priority Data

Sep. 22, 1987 [DE] Fed. Rep. of Germany ....... 3731819

[51] Int. Cl.⁵ .................... F16B 13/04; F16B 13/06
[52] U.S. Cl. ......................... 411/30; 411/55; 411/60
[58] Field of Search ............... 411/39, 40, 44, 54, 411/55, 57, 60, 69, 70, 71, 72, 30, 31

[56] References Cited

U.S. PATENT DOCUMENTS

| 688,756 | 12/1901 | Tripp | 411/57 X |
| 2,470,924 | 5/1949 | Flogaus | 411/57 |
| 4,560,311 | 12/1985 | Herb | 411/44 |
| 4,636,123 | 1/1987 | Herb | 411/55 |
| 4,797,044 | 1/1989 | Velasco | 411/55 X |

FOREIGN PATENT DOCUMENTS

| 2828497 | 1/1980 | Fed. Rep. of Germany | 411/55 |
| 3134876 | 3/1983 | Fed. Rep. of Germany | 411/57 |
| 1469966 | 1/1967 | France | 411/55 |
| 6508503 | 1/1967 | Netherlands | 411/55 |
| 2109886 | 6/1983 | United Kingdom . | |

OTHER PUBLICATIONS

Peterson, Scott A., "Blind Fastener is Easy to Install", *NASA Tech Briefs*, Spring 1981, pp. 80–81.

*Primary Examiner*—Neill R. Wilson
*Attorney, Agent, or Firm*—Toren, McGeady & Associates

[57] ABSTRACT

An expansion dowel assembly is made up of an anchor bolt and an expansion sleeve laterally enclosing the bolt. The sleeve is expanded by driving it in the axial direction relative to the bolt so that the leading end of the sleeve widens as it moves axially over a conically shaped expanding member at the leading end of the bolt. Cutting teeth are formed on the outer surface of the sleeve at its leading end and provide a saw-tooth section. The teeth cut into the surface of a borehole in a receiving material and form an undercut in the borehole surface as the sleeve is expanded. To facilitate expansion, an annular groove is located in the inside surface of and adjoining the cutting teeth. The annular groove is spaced on the opposite side of the cutting teeth from the leading end of the expansion sleeve.

3 Claims, 1 Drawing Sheet

EXPANSION DOWEL ASSEMBLY

BACKGROUND OF THE INVENTION

The present invention is directed to an expansion dowel assembly including an anchor bolt with a conically shaped expanding member at the leading end of the bolt and with a cylindrical shank extending from the expanding member toward the trailing end of the bolt. Adjacent its trailing end, the shank has means for attaching a load to the bolt. An expansion sleeve laterally encloses the anchor bolt and is displaceable relative to it. The sleeve has axially extending slots proceeding from the leading end toward the trailing end. The inside diameter of the expansion sleeve corresponds to the outside diameter of the shank, and the expansion sleeve has a circumferentially extending cutting tooth at its leading end.

Expansion dowels of the above type are disclosed in British patent GB 2 109 886 B and are anchored by driving the expansion sleeve over a conically shaped expanding member on the anchor bolt. The expanding member is supported at the base of a borehole for effecting the radial expansion of the sleeve. The cutting tooth arranged at the leading end of the expansion sleeve forms an undercut in the surface of the receiving material. If a pulling force is applied to the anchor bolt, an after-expansion of the expansion sleeve takes place. Since the expansion sleeve has only a single cutting tooth, the energy required for driving the expansion sleeve relative to the expanding member is relatively high.

SUMMARY OF THE INVENTION

Therefore, it is the primary object of the present invention to provide an expansion dowel assembly where the required energy for displacing the sleeve relative to the anchor bolt is low and a secure anchorage of the assembly is possible.

In accordance with the present invention, additional cutting teeth are provided on the outer surface of the expansion sleeve adjacent to and on the trailing side of the tooth at the leading end of the sleeve. In combination, the cutting teeth form a substantially sawtooth-shaped section or profile facing outwardly. With a plurality of cutting teeth on the expansion sleeve, the removal of the material in the borehole surface when the assembly is being anchored in the borehole is distributed to the individual cutting teeth according to the principle of a broaching tool. Accordingly, overloading of the cutting teeth is prevented. With the reduction in the energy required for the placement of the expansion dowel assembly, it is possible to provide a relatively large cone angle for the expanding member on the anchor bolt, preferably the angle is in the range up to approximately 30°. As a result, the expansion dowel assembly can be used in a zone of the receiving material which contains cracks, since the expansion force is limited due to the large cone angle and any crack extending through the borehole is not opened further. Preferably, the sawtooth section of the cutting teeth is shaped so that the steeper flank faces in the direction in which the assembly is inserted into a borehole, that is, toward the leading end of the anchor bolt, and the less steep flank faces in the opposite direction.

It is advisable to provide a total of three cutting teeth for an effective distribution of the forces developed when the material is removed from the surface of the borehole. Preferably, the three cutting teeth are equally spaced in the axial direction of the sleeve, whereby each cutting tooth removes approximately the same amount of material from the borehole surface as the assembly is anchored in the borehole.

While the expansion dowel assembly is being anchored in the borehole, a relatively sharp deformation of the expansion sleeve takes place in the expansion region. To facilitate such deformation, it is advantageous for the expansion sleeve to have a cross-sectional reduction adjacent to and on the opposite side of the cutting teeth from the leading end of the sleeve. Axially extending tabs formed by the slots in the expansion sleeve can be bent outwardly as the sleeve moves into the borehole relative to the expanding member without any considerable expenditure of force due to the cross-sectional reduction in the sleeve. Since the cross-sectional reduction is only stressed during the loading of the expansion dowel assembly, it has no negative influence on the anchoring value of the assembly. It is preferable if the cross-sectional reduction is formed by an annular groove in the inside surface of the sleeve. Such an annular groove in the inside surface of the sleeve is relatively simple to produce and does not result in any reduction in the contact surface of the expansion dowel assembly with the surface of the borehole.

Another preferred advantageous feature is the formation of the annular groove in the outside surface of the expansion sleeve. If the annular groove is formed in the outside surface of the sleeve, it is at least partially closed as the tab or sections of the sleeve between the slots are bent outwardly, so that the contact of the expansion sleeve with the surface of the borehole is not impaired in practice by the annular groove.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
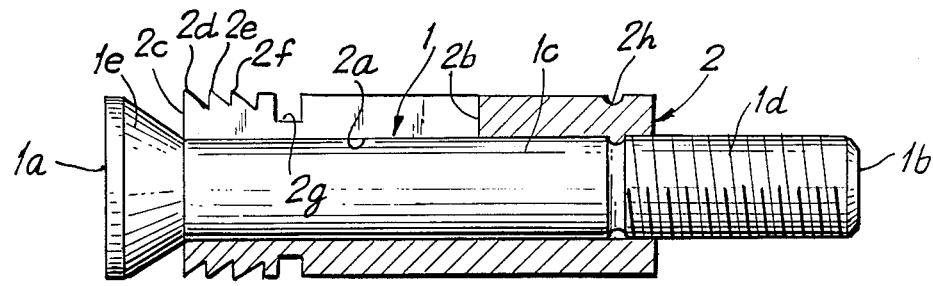
FIG. 1 is an axially extending view, partly in section of an expansion dowel assembly embodying the present invention and displayed in the unexpanded state.
Figure 2:
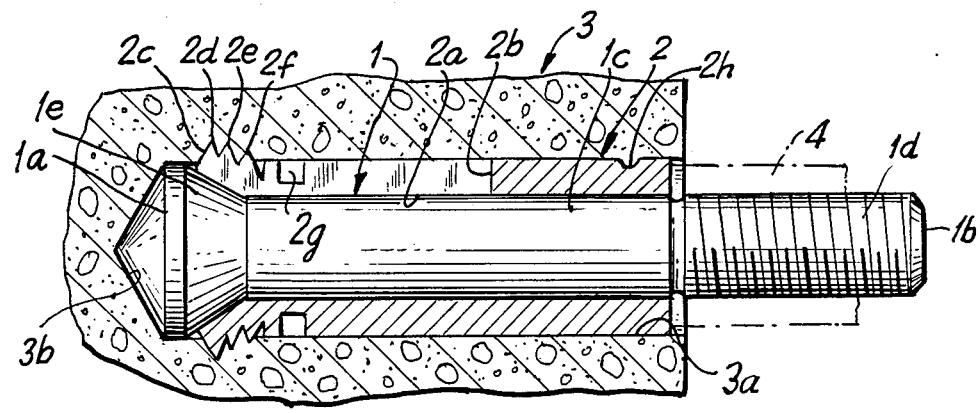
FIG. 2 is a view similar to FIG. 1 illustrating the expansion dowel assembly inserted into a borehole and in the expanded state.
Figure 3:
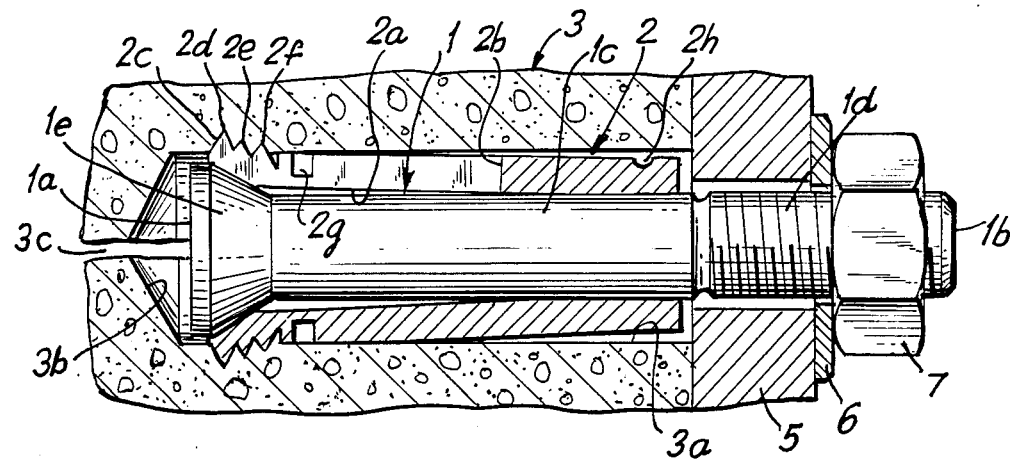
FIG. 3 is a view similar to FIGS. 1 and 2 with the anchor bolt assembly shown in the finally anchored state.

In FIGS. 1, 2 and 3, an expansion dowel assembly embodying the present invention is illustrated with the assembly including an axially exending anchor bolt 1 and an axially extending expansion sleeve 2 laterally enclosing at least a portion of the bolt. The expansion sleeve 2 is axially displaceable relative to the anchor bolt 1. Anchor bolt 1 has a leading end 1a, that is, the end inserted first into a borehole, and a trailing end 1b. An axially extending section of the anchor bolt is formed by a cylindrically-shaped shank 1c. At the trailing end region of the shank 1c extending from the trailing end of the bolt 1b, there is an axially extending thread 1d for securing a load to the anchor dowel assembly. A conically shaped expanding member 1e is located at the leading end of the shank 1c and forms the leading end 1a of the bolt 1. Expanding member 1e diverges from the shank 1c toward the leading end 1a and has a cone angle of approximately 30°. Expansion sleeve 2 has an axially extending bore 2a with an inside diameter corresponding approximately to the outside diameter of the shank 1c. The inside diameter of the expansion sleeve 2 permits it to be displaced axially relative to the bolt 1. Axially extending slots 2b are formed in the expansion sleeve 2 with the slots extending from the leading end 2c of the sleeve toward the trailing end. As can be seen in the drawing, the slot extends to a point between the leading end and trailing end of the sleeve. The slots 2b afford radial expandability of the sleeve. At its front end 2c, expansion sleeve 2 has a circumferentially extending cutting tooth 2d. Two additional circumferentially extending cutting teeth 2e, 2f are formed in the outer surface of the expansion sleeve 2 on the opposite side of the tooth 2d from the leading end of the sleeve. Cutting teeth 2d, 2e, 2f are in adjoining relation and have a substantially sawtooth-shaped cross-section facing outwardly with respect to the outer surface of the sleeve. The cutting teeth are similarly shaped and each has a steep flank extending transversely of the sleeve axis and facing toward the leading end 2c of the sleeve and less steep or inclined flanks, inclined at an angle to the sleeve axis, and facing generally toward the trailing end of the sleeve. On the trailing side of the cutting teeth 2d, 2e, 2f, the expansion sleeve 2 has a cross-sectional reduction formed by a circumferentially extending annular groove 2g with the groove located in the outer surface of the sleeve. The groove 2g is intersected by the slots 2b. This cross-sectional reduction, formed by the groove 2g, affords an improved deformation of the expansion sleeve during the expanding step. Toward its trailing end, expansion sleeve 2 has one or more indentations 2h in its outer surface which provide projections from its inner surface, note FIG. 1. These projections engage in the thread 1d on the bolt 1 and secure the expansion sleeve 2 on the anchor bolt 1.

In FIG. 2, the expansion dowel assembly is inserted into a borehole 3a formed in a receiving material 3. As a result, the leading end 1a of the bolt 1 bears against the base 3b of the borehole 3a. Expansion sleeve 2 is driven axially into the borehole over the expanding member 1e of the anchor bolt 1 by a tubular placement tool 4, shown in dot-dash lines. As the expansion sleeve moves axially relative to the anchor bolt, the projections extending inwardly from the inside surface of the sleeve, formed by the indentations 2h, are sheared off. Further, the cutting teeth 2d, 2e, 2f are forced radially outwardly into contact with the surface of the borehole 3a and cut away a part of the receiving material 3 forming an undercut section. Accordingly, a positive locking connection between the expansion sleeve 2 and the receiving material 3 is effected. Annular groove 2g and the axially extending slots 2b facilitate the radial expansion of the axially extending leading end section of the expansion sleeve 2.

In FIG. 3, a part 5 is placed on the threaded trailing end section of the anchor bolt 1 and is secured against the outside surface of the receiving material 3 by a washer 6 and a nut 7 screwed onto the thread 1d. In the base of the borehole 3a, a crack 3c is shown in the receiving material 3. The opening of the crack 3c makes it possible to draw the anchor bolt 1 into the expansion sleeve 2, which is anchored in the receiving material 3 in a positive locking manner. The explosive effect of the expansion dowel assembly on the crack 3c is slight because of the large cone angle of the expanding member 1e on the anchor bolt 1.

While specific embodiments of the invention have been shown and described in detail to illustrate the application of the inventive principles, it will be understood that the invention may be embodied otherwise without departing from such principles.

I claim:

1. Expansion dowel assembly comprising an axially elongated anchor bolt having a leading end and a trailing end spaced apart in the axial direction, an expanding member located at the leading end of said anchor bolt and having an axially extending conically shaped surface converging toward the trailing end, an axially elongated shank extending from said expanding member toward the trailing end, means on said shank adjacent the trailing end for attaching a load on said anchor bolt, an axially elongated expansion sleeve laterally enclosing said anchor bolt and being axially displaceable relative to said anchor bolt, said expansion sleeve having a leading end closer to the leading end of said anchor bolt and a trailing end closer to the trailing end of said anchor bolt with slots in said expansion sleeve extending from the leading end toward the trailing end, said expansion sleeve having an inside diameter corresponding to and being displaceable relative to the outside diameter of said shank, said expansion sleeve having an axially extending outer surface with a circumferentially extending first cutting tooth thereon at the leading end thereof, wherein the improvement comprises two additional cutting teeth are formed on the outer surface of said expansion sleeve adjoining said first cutting tooth, and said cutting teeth forming a sawtooth-shaped section facing outwardly from the outer surface of said expansion sleeve, said expansion sleeve has a cross-sectional reduction spaced from and located closely adjacent to said cutting teeth and formed on the opposite side thereof from the leading end of said sleeve, said cross-sectional reduction is formed by a circumferentially extending annular groove located in the outer surface of said expansion sleeve, within the axial extent of the slots.

2. Expansion dowel assembly, as set forth in claim 1, wherein said expanding member has a cone angle of approximately 30°.

3. Expansion dowel assembly, as set forth in claim 1, wherein at least one identation is formed in the outer surface of said sleeve with a corresponding projection formed in the inner surface thereof, said means for attaching a load comprising a threaded section on said shank of said anchor bolt adjacent the trailing end thereof, and said projection being engageable with said threaded section and said projection being sheared off when said sleeve is displaced axially relative to said anchor bolt in the direction toward the leading end of said anchor bolt.

* * * * *